United States Patent [19]

Johnson

[11] 4,430,744
[45] Feb. 7, 1984

[54] ADAPTIVE IF EQUALIZER FOR DIGITAL TRANSMISSION

[75] Inventor: Edward R. Johnson, Sunnyvale, Calif.

[73] Assignee: GTE Automatic Electric Incorporated, Northlake, Ill.

[21] Appl. No.: 331,957

[22] Filed: Dec. 18, 1981

[51] Int. Cl.³ .............................................. H04B 3/04
[52] U.S. Cl. ........................................ 375/14; 333/18; 307/359
[58] Field of Search .............. 375/11, 12, 14; 333/18, 333/28 R; 328/15; 364/724, 825; 307/359

[56] References Cited

U.S. PATENT DOCUMENTS

| | | | |
|---|---|---|---|
| 2,876,283 | 3/1959 | Lundry | 350/523 |
| 3,573,667 | 4/1971 | Kao | 333/18 |
| 3,715,691 | 2/1973 | Kurth | 375/14 |
| 3,763,359 | 10/1973 | Cho et al. | 375/14 |
| 4,251,782 | 2/1981 | Bynum | 375/12 |
| 4,361,892 | 11/1982 | Martin | 375/14 |

OTHER PUBLICATIONS

Hartmann & Allen "An Adaptive Equalizer for Correction of Multipath Distortion in 90/MB/S 8 PSK System", IEEE ICC 79 Record, vol. I pp. 5.6.1-5.6.4, 1979.
Hartmann & Bynum "Adaptive Equalization for Digital Microwave Radio System", IEEE ICC 79 Record, pp. 8.5.1-8.5.6, 1980.

Primary Examiner—Robert L. Griffin
Assistant Examiner—Stephen Chin
Attorney, Agent, or Firm—Leonard R. Cool

[57] ABSTRACT

A radio signal will often suffer from amplitude and group delay distortion caused by multipath fading. An adaptive equalizer, which effectively cancels the amplitude distortion effects, is based upon the use of control voltages derived from selected portions of the IF band; the control voltages being selectively applied to bump and slope equalizer sections to cancel the effects of amplitude distortion. Cancellation of group delay distortion is predicated upon its being proportional to amplitude of the slope correction required. Thus, group delay correction is introduced in relation to the slope correction introduced to compensate for distortion introduced during normal multipath propagation conditions.

8 Claims, 9 Drawing Figures

ADAPTIVE IF EQUALIZER FOR DIGITAL TRANSMISSION

BACKGROUND OF THE INVENTION

This invention relates to the correction of distortion introduced by multipath fading in a radio system and, more particularly, to an adaptive equalizer which acts to cancel the distortion so introduced.

The adverse effects of multipath propagation have been studied for some time. Frequency selective fading due to multipath propagation has been tolerated on microwave paths for many years because these older systems employed frequency modulation, which is inherently resistant to the linear amplitude distortion component that predominates in multipath induced distortion. With the introduction and rapidly expanding use of digital modulation in microwave transmission systems the deleterious effects of multipath-induced in-band distortion requires that such distortion be compensated.

The amplitude and delay characteristics which occur as a result of delay in the arrival of a refracted ray as compared to a direct ray are illustrated in an article "An Adaptive Equalizer For Correction Of Multipath Distortion In A 90MB/s PSK System," by Paul R. Hartmann and Eddie W. Allen, IEEE, ICC 79 Record, Vol. I, pp. 5.6.1–5.6.4. The authors analyze a two-ray model, i.e. direct and refracted rays, and note that the bit error rate (BER) during multipath is controlled by intersymbol interference resulting from frequency dependent amplitude and group delay effects. These deleterious effects were separated into distortions which result in threshold degredation and which could be classified as linear amplitude effects (gain slope), linear group delay and parabolic group delay. Based upon a two-ray model, the authors analyzed the importance of these three effects by calculating the amplitude and group delay slopes in a 30 MHz band width resulting from two-ray 10 dB fades at different absolute delays. It was determined from this analysis that for a given delay and fade depth, the effect of amplitude slope on threshold degradation was most pronounced, i.e., it is a primary source of performance degradation during multipath conditions. Once the amplitude slope degradation was removed, the major deleterious effect was a symmetrical null at the center of the passband. The adaptive equalizer, not shown in the article, was designed to correct for amplitude slope by comparing the signal amplitudes at the two ends of the band and using this information to correct the slope. Similar slope correction arrangements have been and are being used in carrier current systems. A null detection circuit was included in the equalizer and operates on the basis of comparison of the energy at the center of the passband with the total energy in the passband.

A theoretical technique employing the power series modeling for compensation of the distortion effects introduced by multipath fading is briefly discussed in an article "Adaptive Equalizer For Digital Microwave System," by Paul Hartmann and Brian Bynum, ICC 80 Record, pp. 8.5.1–8.5.6. The power series technique shown in FIG. 7 of this article shows a theoretical approach to compensation by introducing amplitude slope, parabolic and cubic modifications of the IF band. The manner in which such modifications may be obtained is not disclosed nor is group delay compensation incorporated in the model shown.

SUMMARY OF THE INVENTION

An adaptive equalizer, which corrects for amplitude and delay distortion introduced in the IF band of a radio signal during propagation, uses a plurality of bump equalizer sections each of which has a bump or dip in a predetermined frequency band, and a slope equalizer to correct for slope variation across the IF band, the slope equalizer also adding group delay based upon the amount of slope correction provided.

DESCRIPTION OF THE PREFERRED EMBODIMENT

Figure 1:
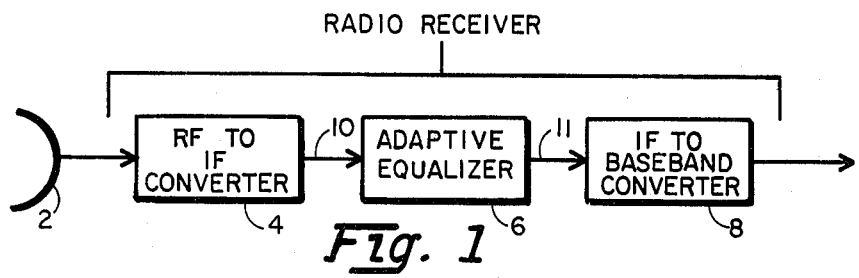
FIG. 1 is a generalized block diagram of a radio receiver illustrating the environment in which the instant invention for an adaptive equalizer (6) is designed to operate.

Referring now to FIG. 1 it may be seen that the adaptive equalizer of the instant invention is positioned so as to take the IF output from the radio frequency section 4 of the radio receiver along a path 10 and operate on the distortion introduced by the transmission medium by adaptive equalizer 6 to obtain a corrected IF output on path 11. While the adaptive equalizer 6 has been shown as a separate part of the radio receiver, it should be understood that the adaptive equalizer could be included as a part of the radio section or within the receiver as one element, or as a part of the If section of a radio receiver. The manner in which the adaptive equalizer operates to cancel the adverse effects of the multipath fading may be readily understood by referring to FIG. 2.

The IF input on path 10 is applied to a series of bump equalizers 12, 16 and 20 each of which are designed to provide a correction at the bump frequencies of 64, 70 and 76 MHz, respectively. The output of bump equalizer 20 is applied via path 22 to a slope equalizer 24 which compensates for amplitude slope across the If band. The output signal on path 26 has been equalized and slope corrected and this signal is applied to one input of automatic level control amplifier 28, which, in turn, provides the corrected and level coordinated signal to output path 30. This corrected signal is then applied to the IF section of the radio receiver via path 11 and to both the automatic level control 40 via path 34, junction 36 and path 38; and to the input of spectral comparator 9 via paths 34, junction 36 and path 44.

Figure 2:
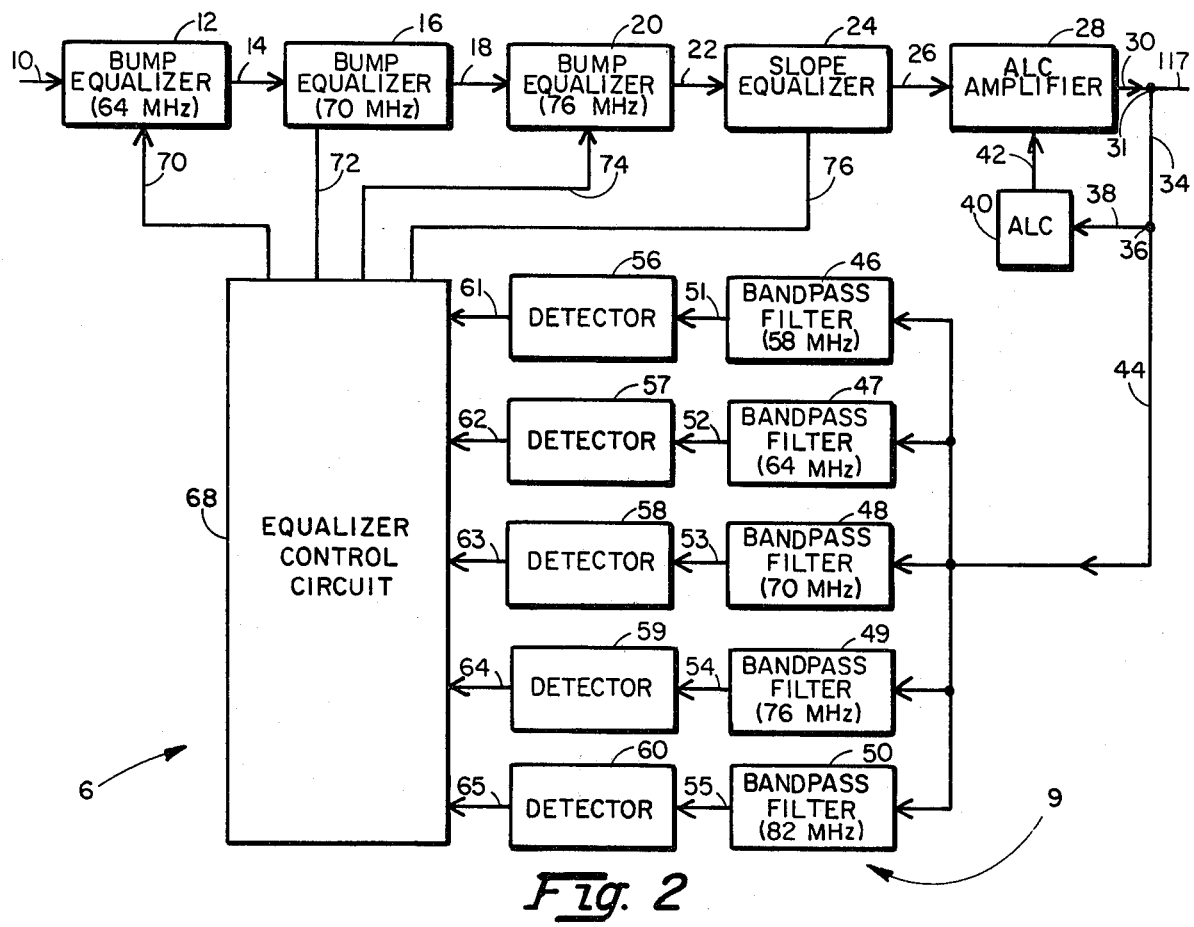
FIG. 2 is a block diagram of the adaptive equalizer 6 in FIG. 1 which includes an automatic level control amplifier 28.

In order to simplify the explanation, it will be assumed that the IF frequency is centered at 70 MHz and has a band width of 30 MHz. Five band-pass filters are used. The detected amplitude levels of those at the extreme ends are used to provide slope correction and a fixed amount of group delay correction based upon the amplitude slope correction. The three intermediate band-pass filters are used to provide bump corrections. Thus, the frequency included in the parentheses within the bump equalizer blocks 12, 16 and 20 of FIG. 2 are the center frequencies of the associated band-pass filters 46–50 which are applicable to these conditions. It should be understood, however, that such limitations as to the IF center frequency, the IF band widths, and the number of band-pass filters used are not a requirement for the practice of the invention described herein.

Referring now to the spectral comparator 9, it is seen for the IF frequency conditions specified, that there are 5 band-pass filters 46–50. To effectively cover the band of interest, each band-pass filter has a 3 dB band width of approximately 5 MHz. The frequency included in parenthesis within each band-pass filter block is the center frequency for which that filter is designed to operate. In our example the five band-pass filters are designed for center frequencies of 58, 64, 70, 76 and 82 MHz, respectively. Such band-pass filters are well known and are not described in detail herein. The net circuit gain for the band-pass filter and its associated detector, one for each filter as shown, is adjusted in the presence of an undistorted signal to provide equal outputs from each of the five detectors.

The detectors consist of biased hot carrier diodes, such as the Hewlett-Packard, HP 5082-2647, balanced against a reference diode for thermal stability. The output of each detector is amplified and buffered by an operational amplifier having a voltage gain of 10. Such detector arrangements are well-known and will not be discussed further here. The slope control voltage 76 is determined by computing the difference between the outputs of the 58 and 82 MHz detectors in equalizer control circuit 68 and providing this information on output path 76 to the voltage control input of slope equalizer 24. Thus the slope equalizer 24 is controlled by the difference in signal amplitudes of the frequencies appearing at the extreme edges of the IF band. In addition to slope correction, the slope equalizer introduces group delay correction in an amount which is proportional to the amplitude slope correction derived from the detected extreme frequency differentials.

Each of the bump equalizers (12, 16, 20) has a separate control voltage (70, 72, 74) which is determined by computing the difference between the specific bump frequency detector output (62, 63, 64) and the average of the detector output at the lower adjacent frequency band and the detector output at the higher adjacent frequency band (61 and 63; 62 and 64; 63 and 65). Thus, the separate control voltages, determine whether the spectrum at the measuring frequency is higher or lower than the adjacent frequencies. Since the average of the signal power in the adjacent frequency bands is used, slope distortion does not generate an error in the output control voltage.

Figure 3:
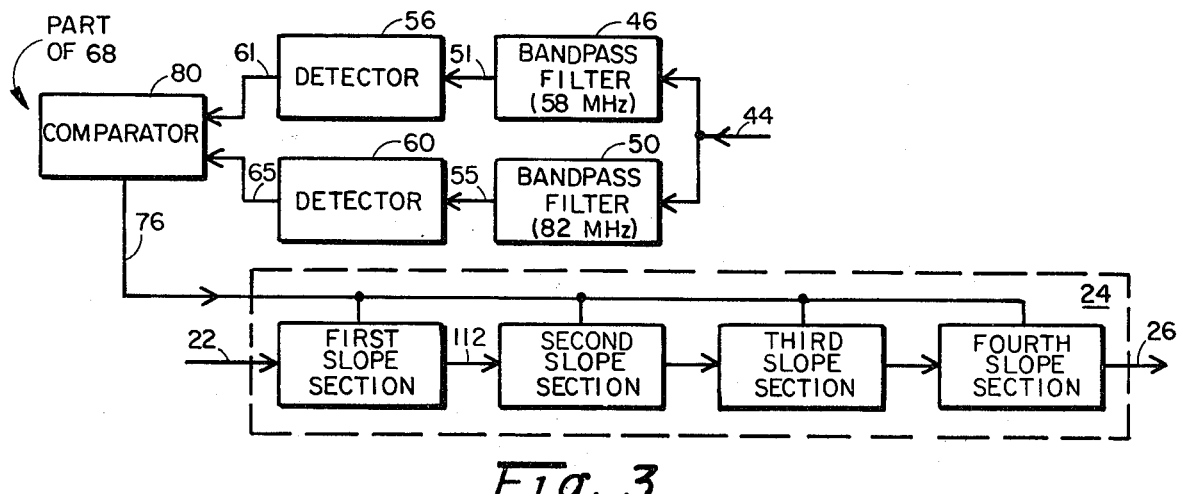
FIG. 3 is a block diagram illustrating how the amplitude slope control voltage 76 is obtained by circuit 68 of FIG. 2, and the arrangement of the four sections of the slope equalizer 24 there.

Referring now to FIG. 3, a circuit which may provide the control voltage 76 for the slope equalizer sections may be seen. The corrected and level compensated IF signal appears on path 44 and is applied simultaneously to the input ports of band-pass filters 46 and 50 which select the frequencies centered at 58 MHz and 82 MHz, respectively. The detected outputs from detectors 56 and 60 are applied via paths 61 and 65 to a comparator 80 which is a part of equalizer control circuit 68. Recalling that the gain through each band-pass filter and associated detector stage have been adjusted to be equal, when an undistorted signal has been applied, it is apparent that the signal amplitudes now appearing on paths 61 and 65 are representative of the differential in slope across the IF band. Comparator 80 is representative only and the junction may, in fact, be obtained by using an analog computer to derive the control voltage which appears on path 76. Again, the amplitude of the control voltage being dependent on the differential of the input signals to comparator 80. The slope equalizer consists of four slope correction sections as shown at 24, FIG. 3. Each slope section generates the same amount of amplitude slope and has the same shaped response. Because the type of equalizer employed actually produces a cosine-shaped response when linear slope is needed, multiple stages have been used, with each stage contributing part of the total response while remaining within its linear slope range. This results in a voltage controlled slope equalizer that produces 20 dB of positive or negative slope across the 30 MHz wide channel.

Three of the slope sections produce amplitude and group delay slopes of the same sense, i.e., increasing amplitude corresponds to increasing group delay. The remaining stage can produce group delay of either sense by strap option. When strapped for the opposite sense, its group delay will cancel the delay produced by one of the other stages leaving a net delay of two stages. When strapped for the same sense delay, the net delay of four stages is produced. This 2:1 change in delay allows the equalization to be optimized for short or long multipath delays. Because the slope sections are essentially identical only one will be described in detail, and such a one is shown in FIG. 4.

Figure 4:
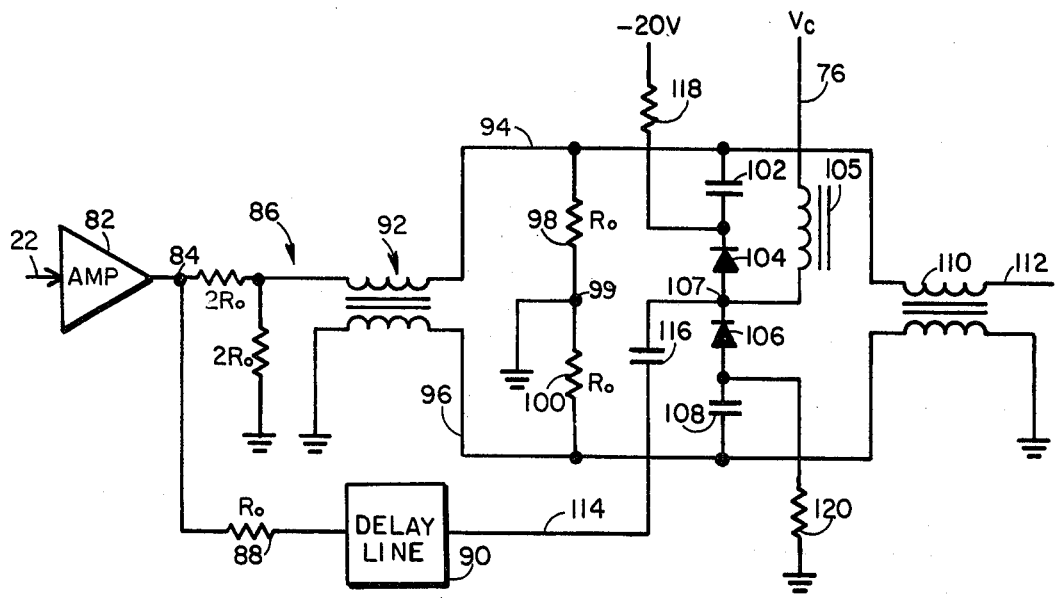
FIG. 4 is a schematic diagram of the first slope correction section of slope equalizer 24 in FIG. 3.

Referring to FIG. 4, it may be seen that the output from bump equalizer 20 along path 22 is applied to the input of buffer amplifier 82 which provides gain isolation and a low impedance output for signal splitting. At the split, junction 84, the main signal is attenuated by 6 dB in a voltage divider 86 and enters the "IF INPUT" port of a 70 MHz summing junction. At this input, a balun transformer 92 converts the incoming signal to a balanced configuration. Each side of the balanced line is shunted by a 75 ohm resistor 98 and 100 and these resistors form one branch of a balanced bridge circuit. Note that the junction 99 is connected to ground. The other branch of the bridge comprises a series pair of PIN diodes oriented so as to conduct in the same direction. A bias voltage is applied via resistor 118 through the diodes and thus through resistor 120 to ground. By so doing the diodes are both biased to be conducting and to have an impedance of about 500 ohms. Blocking capacitors 102 and 108 prevent the biasing voltage from appearing in the "IF INPUT" path. A DC control voltage appearing on path 76 from equalizer control circuit 68 is applied via an inductor 105 to the node 107 between diodes 104 and 106. The presence of the control voltage on path 76 causes a differential variation in the diode resistance and, of course, unbalances the bridge circuit. This characteristic allows a signal coupled to the diode node 107 to be added to both sides of the balanced line, but in differential amounts as determined by the control voltage 76. This coupled signal is the secondary signal from the split at junction 84 and comes via resistor 88, delay line 90 and blocking capacitor 116 to the node 107. This secondary signal passes through a 10.7 nsec delay line and at 70 MHz this delay corresponds to a 90 degree phase difference between the main and the secondary signals. Nodal and anti-nodal frequencies are 46.7 MHz and 93.3 MHz or 70±23.3 MHz.

Figure 6:
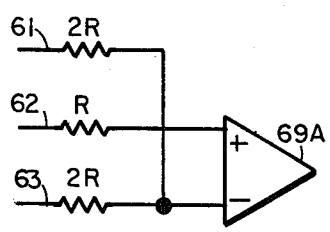
FIG. 6 is a schematic diagram illustrating how the average of the output voltages 61 and 63 from adjacent detectors 56 and 58 in FIGS. 2 and 5 is obtained and the use of an operational amplifier 69A to obtain the differential, i.e., the separate control voltage 70.

When the secondary signal is added in phase, a null occurs at 46.7 MHz and peak at 93.3 MHz, causing positive slope in the pass band. Added out of phase, a peak occurs at 46.7 MHz and a null at 93.3 MHz, causing negative slope in the passband. These characteristics are illustrated in FIG. 6.

The second equalizer section can be strapped to operate as described above or such that the main signal is delayed with reference to the secondary signal. When so strapped, this causes the magnitude of the delayed signal to be greater than the undelayed signal resulting in group delay shapes that are out of phase with the amplitude shape and, most importantly, out of phase with the group delay of the other three stages. As mentioned hereinabove, this allows the delay of two stages to be canceled leaving the delay of the remaining two stages to contribute to the group delay slope.

As was noted in FIG. 2 for the illustrative example, bump equalization was accomplished by the use of three bump equalizers. Each bump equalizer is tuned to a different frequency in the passband. For the illustrative example, the frequencies are 64, 70 and 76 MHz. Each equalizer can produce a peak or dip at its resonant frequency and the magnitude of the peak or dip is controlled by a separate DC voltage from the equalizer control circuit 68.

Figure 5:
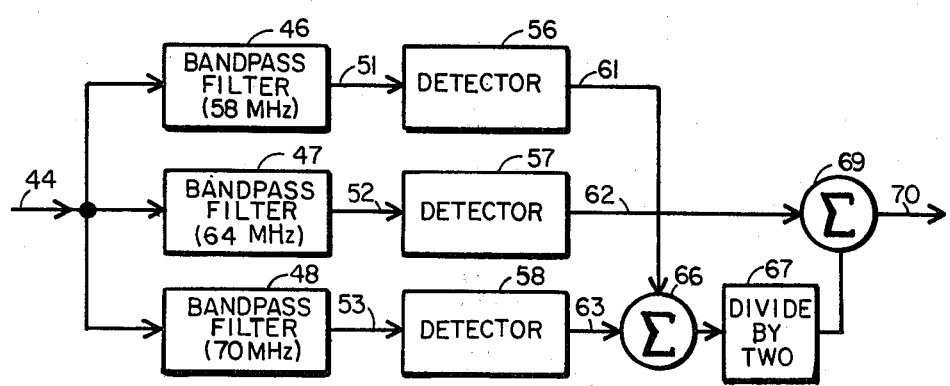
FIG. 5 is a block diagram illustrating how one of the separate control voltages 70, 72 and 74 in FIG. 2 is obtained by the circuit 68 of FIG. 2.

The manner in which the control voltages for the bump equalizer are obtained from circuit 68 is shown in FIG. 5. The detected voltage for the center frequency band is directly applied along path 62 to one input to summer 69, whereas, the detected voltages from the adjacent frequency bands are applied, via paths 61 and 63 to the inputs of summer 66. The average detected value is obtained by dividing the sum by two and this average value is applied to a second input of summer 69. Summer 69 provides a differential output on path 70 which is applied as a control voltage at one input to bump equalizer 12. A circuit diagram illustrating the manner in which the detected outputs may be combined to obtain the desired control voltage is shown in FIG. 6. Note that for the detected adjacent frequency band outputs 61 and 63 a resistance value of 2R is used and one ends of the two resistors are electrically connected together forming the summing junction. By using resistors which are twice that for the center frequency band, the average value is obtained, which is applied to the inverting input of operational amplifier 69A. The direct center frequency band voltage is applied to the non-inverting input and the differential output is then available at the output of the operational amplifier at path 70.

Figure 7:
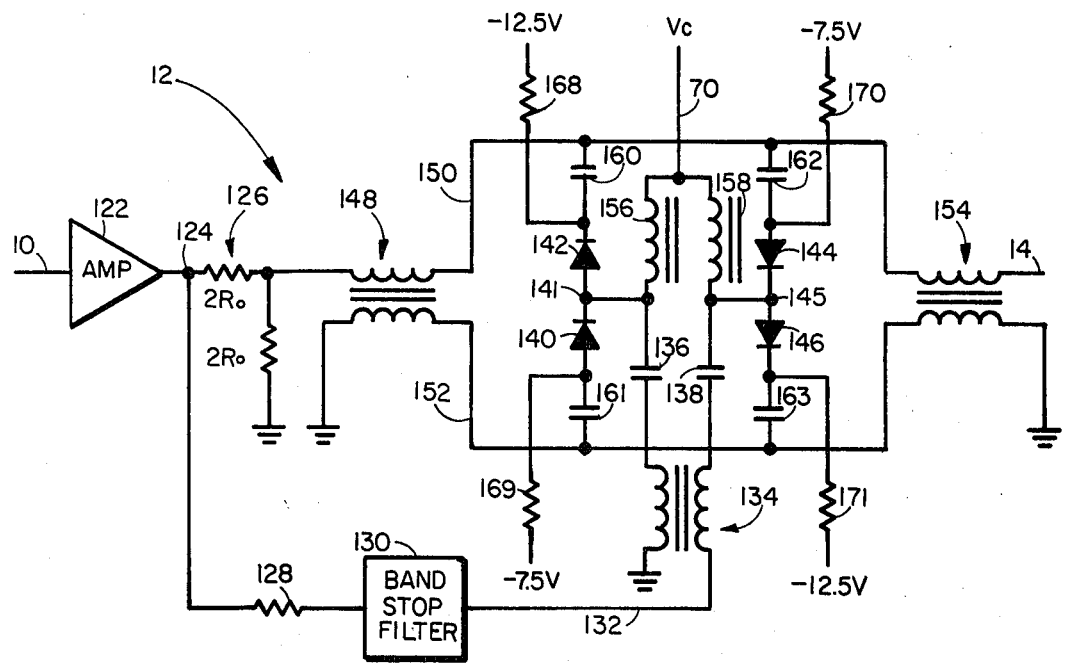
FIG. 7 is a schematic diagram of a bump equalizer 12 in FIG. 2.
Figure 8:
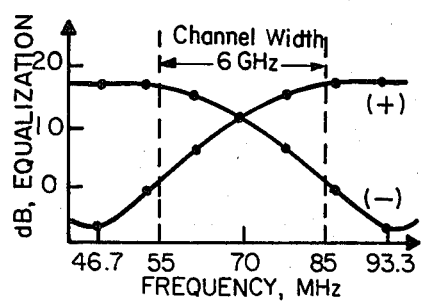
FIG. 8 is a graph illustrating the response of the four section slope equalizer 24 in FIGS. 2 and 3.
Figure 9:
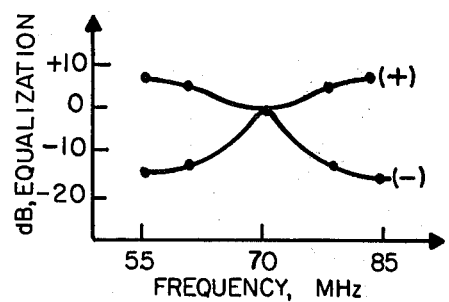
FIG. 9 is a graph illustrating the bump equalizer amplitude response for one section, i.e., bump equalizer 16 in FIG. 2.

A schematic diagram of the bump equalizer for the 64 MHz frequency is shown in FIG. 7. The configurations for the bump equalizers for the 70 MHz and the 76 MHz equalizers are substantially identical, with the primary difference being the frequency characteristics of band stop filter 130. Each of the band stop filters have been designed to substantially reject the frequencies passed by the associated band pass filter of the spectral comparator 9. The control voltage for the 70 MHz and 76 MHz equalizers are obtained in the same manner as described for the 64 MHz equalizer; but, of course, using as the one voltage that which is derived from the associated detector and for the other voltage the average of the voltages from the adjacent frequency band detectors.

Referring now to FIG. 7, the buffer amplifier 122 provides gain and a low impedance point for signal splitting as was done with the slope equalizer. At the split, or junction 124, the main signal is attenuated by 6 dB in a voltage divider 126 and enters the "IF INPUT" port of a balanced differential summing junction. Again a balun 148 is used to convert the unbalanced output of amplifier 122 into a balanced circuit for connection to the balanced summing junction. The balanced differential summing junction is a bridge configuration in which the first branch is a pair of PIN diodes 140 and 142 connected to have the same polarity between the two leads of the "IF INPUT" path and with the other branch consisting of diodes 144 and 146 but connected with a polarity opposite to that of the first pair of diodes.

The secondary signal passes through a high-Q parallel resonance circuit tuned to the bump frequency, i.e., band stop filter 130. This network attenuates signals at the bump frequency. When this secondary signal is added out of phase with the main signal, cancellation occurs above and below the bump frequency, causing a "bump" to be formed in the amplitude response of the summing junction. When added in phase, voltage addition occurs above and below the bump frequency causing a "dip" to be formed in the amplitude response. The magnitude of dips and bumps are determined by the amount of secondary signal added to the main signal. The secondary signal path at the "NETWORK IN" port of the summing junction has a balun 134 to provide a balanced signal input to the nodes 141 and 145 of the diode pairs. This balun also insures that both the main and secondary paths have equal time delay to the summing point. Equal time delay is necessary to produce symmetrical bumps and dips and to have the bump and dip frequency be the same.

The diodes are operated as linear commutating variable resistors. The result is that the secondary signal may be added in or out-of-phase, with a continuously variable magnitude, to the main balanced signal. One control voltage is applied via path 70 via a pair of inductors 156, 158 to the respective nodes 141 and 145.

A third balun 154 is used to restore the output to an unbalanced configuration. The first two bump equalizers have a shunt choke at their output for amplitude slope correction.

The third equalizer has a shunt capacitor for impedance matching to 75 ohms. The inductors and capacitors were included to compensate for amplitude slope introduced by the bump equalizers, and constitute good engineering design. However, they are not pertinent to the equalizer design and thus, are not a part of the invention as disclosed herein.

The bump equalizer amplitude response for the 70 MHz section is shown in FIG. 7. It is to be noted that a bump occurs for the out of phase condition (minus) and a dip occurs for the in phase addition (plus).

Laboratory measurements using a 90 MB/s, 8 PSK, 6 GHz radio and a two ray multipath simulation were performed. A comparison of threshold performance with and without adaptive equalizer was made for two cases of path delay $\Delta t$.

Case 1
$\Delta t = 2.1$ nsec
Threshold = $10^{-6}$ BER
Frequency = 6 GHz

An analysis of the plot (not shown) of Case 1 shows a typical improvement in threshold of 10 dB or greater for multipath phase angles from 120° to 220°.

Case 2
$\Delta t = 7.2$ nsec
Threshold = $10^{-6}$ BER
Frequency = 6 GHz

In this analysis it was found that the fading is much more selective causing loss of reception over a broad area. However, a typical threshold improvement of 8 dB or greater was noted for multipath phase angles from 85° to 280°.

While the invention has been particularly shown and described with reference to a preferred embodiment thereof, it will be understood by those skilled in the art that change in form and detail may be made therein without departing from the spirit and scope of the invention.

What is claimed is:

1. In a receiving terminal of a radio system, an adaptive equalizer serially connected between the If output of the radio receiver section and the IF base band converter for correcting amplitude and delay distortion introduced into the radio signal during propagation, comprising:

a plurality of band-pass filters having center frequencies spaced at equal intervals across the passband of the IF band of the radio receiver, each filter having equal passbands that are adjacent but not overlapping, the band-pass filter inputs being connected together for receiving a corrected signal at the output of the adaptive equalizer; each band-pass filter providing that portion of the radio signal selected by the passband of the filter at a separate output port;

a plurality of detectors, one for each of the plurality of band-pass filters, each detector having an input terminal adapted to receive the selected signal from the output port of an associated band-pass filter and each detector providing at an output port a detected or direct current voltage, the amplitude of which varies in accordance with the amplitude of the associated selected signal and which is proportional thereto;

a control circuit means having a plurality of input ports each accepting the direct current voltage from an associated detector, and providing at an output a first control voltage having an amplitude that is proportional to the difference in amplitude of the detected voltages of the detectors associated with the end point band-pass filters which have passbands nearest the lower and upper frequency ends of the IF band, and providing separate control voltages at associated outputs, one for each detected voltage from each detector that is associated with the intermediate band-pass filters, the amplitude of each of said separate control voltages being derived from the difference between the detected output voltage of an associated detector and an average of the detected output voltages of the adjacent detectors;

bump equalizer means having a number of tandem sections equal to the number of intermediate band-pass filters, each of said sections being responsive to an associated separate control voltage; each of said bump equalizer sections either attenuating or enhancing the IF frequencies which appear in the passband of an associated band-pass filter, the amount of attenuation or enhancement being proportional to the amplitude difference and sign between the associated separate control voltage and a reference voltage, whereby a dip or bump occurs at the selected bassband frequencies; said bump equalizer means having an input port for accepting the IF frequencies from the radio frequency section, having a plurality of inputs, one for each separate control voltage, and having an output port;

slope equalizer means having an input port adapted for connection to the output port of said bump equalizer means, having an input adapted to accept said first control voltage, said slope equalizer means being responsive to said first control voltage to correct for the slope introduced across the IF band and to insert group delay correction, which is proportional to the amplitude of the slope correction, and having an output port; and means responsive to the output port signal of said slope equalizer means for maintaining a prescribed signal level at the output port thereof which is the output of the adaptive equalizer.

2. An adaptive equalizer as set forth in claim 1 in which the plurality of band pass filters and associated detectors each equal five.

3. An adaptive equalizer as set forth in claim 1 or 2 wherein each of said bump equalizer sections comprises:

a first buffer amplifier having an input adapted to receive the IF signal, said buffer amplifier providing gain and a low impedance output for signal splitting;

a first main signal path having first and second leads;

a diode bridge circuit in which a first pair of diodes in a first branch are poled in one polarity, the cathode of the first diode of the first pair being electrically connected to said first lead of the main path, and the anode of the second diode of the first pair being electrically connected to said second lead of the main path, the anode of said first diode and cathode of said second diode being connected together to form a first junction; third and fourth diodes of a second pair being arranged to form a second branch, said third and fourth diodes being poled and in the same sense and having the anode of the said third diode connected to the cathode of said fourth diode to form a second junction, the opposite ends of said third and fourth diodes being electrically connected to said second and first leads of said first main path so as to be of opposite polarity from said first diode pair;

a first bias voltage source electrically connected to said diodes whereby a predetermined quiescent operating state is obtained in which the impedance of each branch of said first bridge circuit is substantially the same;

first means for connecting an associated one of the separate control voltages to said first and second junctions, whereby a differential impedance is obtained in the bridge; and a band stop filter having an input port adapted to receive the output signal from said first buffer amplifier, and having an output port electrically connected to said first and second junctions; said band stop filter attenuating signals at the bump frequency of the section, whereby a bump or dip will be formed in the output signal of said first main path depending upon whether the attenuated signals are added out-of-phase or in-phase, respectively, with said main signal, the amplitude of the dip or bump being dependent upon the amplitude of the secondary or attenuated signal which is added to the main signal and is in turn dependent upon the amplitude of the associated separate control voltage.

4. An adaptive equalizer as set forth in claim 3 wherein said slope equalizer comprises:

a second buffer amplifier having an input connected to receive the bump corrected signal from said bump equalizer, said second amplifier providing gain and a low impedance output for signal splitting;

a second main signal path having third and fourth leads;

a second bridge circuit in which a third branch thereof comprises first and second equal valued resistors having one ends thereof connected together to form a third junction which is connected to ground and having the other end of the first resistor connected to said third lead and the other end of said second resistor connected to said fourth lead; a fourth branch thereof comprising fifth and sixth diodes poled in the same direction, the cathode of said fifth diode being connected to the anode of said sixth diode to form a fourth junction, the anode of said fifth diode being electrically connected to said fourth lead and the cathode of said sixth diode being electrically connected to said third lead;

a second bias voltage source electrically connected to said fourth branch whereby a predetermined quiescent operating state is obtained in which the impedance of said fifth and sixth diodes is set;

second means for connecting said first control voltage to said fourth junction to alter the bias voltage applied to said fifth and sixth diodes whereby an unbalanced bridge condition is created when the first control voltage is present, the degree of unbalance being a function of the amplitude and sign of the first control voltage; and a delay line having an input port adapted to accept the output of said second buffer amplifier and having an output port electrically connected to apply the delayed signal to said fourth junction, a differential amount of delayed signal being added to or subtracted from a main signal on the second main signal path depending upon the degree of unbalance of the second bridge.

5. Apparatus as set forth in claim 4 wherein the IF band is centered at 70 MHz and has a passband substantially between 55 and 85 MHz.

6. Apparatus as set forth in claim 5 wherein the five band-pass filters each have a band width of 5 MHz and center frequencies are 58, 64, 70, 76 and 82 MHz, respectively.

7. Apparatus as set forth in claim 6 wherein the bump equalizer consists of three sections each responsive to a different separate control voltage derived from the detector output of a band-pass filter having a center frequency of 64, 70 and 76 MHz and the average of the outputs of the detectors adjacent to the associated center frequency detector.

8. The adaptive equalizer as set forth in claim 7 wherein the slope equalizer consists of four sections each responsive to the same first control signal.

* * * * *